United States Patent
Hasegawa et al.

(10) Patent No.: US 9,705,120 B2
(45) Date of Patent: Jul. 11, 2017

(54) LAMINATED POROUS FILM AND NON-AQUEOUS ELECTROLYTE SECONDARY BATTERY

(75) Inventors: Hirohiko Hasegawa, Niihama (JP); Yuzuru Saitou, Niihama (JP)

(73) Assignee: SUMITOMO CHEMICAL COMPANY, LIMITED, Chuo-ku, Tokyo (JP)

(*) Notice: Subject to any disclaimer, the term of this patent is extended or adjusted under 35 U.S.C. 154(b) by 344 days.

(21) Appl. No.: 14/234,700

(22) PCT Filed: Jul. 17, 2012

(86) PCT No.: PCT/JP2012/068541
§ 371 (c)(1),
(2), (4) Date: Jan. 24, 2014

(87) PCT Pub. No.: WO2013/015230
PCT Pub. Date: Jan. 31, 2013

(65) Prior Publication Data
US 2014/0178741 A1 Jun. 26, 2014

(30) Foreign Application Priority Data
Jul. 28, 2011 (JP) .................................. 2011-65964

(51) Int. Cl.
*H01M 2/16* (2006.01)
*C08J 7/04* (2006.01)
*C08J 7/12* (2006.01)

(52) U.S. Cl.
CPC .......... *H01M 2/1686* (2013.01); *C08J 7/047* (2013.01); *C08J 7/123* (2013.01); *H01M 2/1653* (2013.01); *C08J 2323/06* (2013.01); *C08J 2400/14* (2013.01); *C08J 2401/28* (2013.01); *H01M 2/166* (2013.01)

(58) Field of Classification Search
CPC .. H01M 2/1653; H01M 2/166; H01M 2/1686; C08J 7/047; C08J 7/123; C08J 2323/06; C08J 2400/14; C08J 2401/28
See application file for complete search history.

(56) References Cited

U.S. PATENT DOCUMENTS

| | | | |
|---|---|---|---|
| 2007/0178384 A1 | 8/2007 | Kajita et al. | |
| 2010/0068612 A1 | 3/2010 | Nishikawa | |
| 2010/0255380 A1 | 10/2010 | Baba et al. | |
| 2010/0285348 A1 | 11/2010 | Murata et al. | |
| 2011/0311856 A1 | 12/2011 | Matsui et al. | |
| 2013/0101889 A1 | 4/2013 | Mizuno et al. | |

FOREIGN PATENT DOCUMENTS

| | | | |
|---|---|---|---|
| CN | 101600571 A | | 12/2009 |
| CN | 102089901 A | | 6/2011 |
| JP | 10-3898 A | | 1/1998 |
| JP | 10-172531 A | | 6/1998 |
| JP | 2001-23602 | | 1/2001 |
| JP | 2004-227972 A | | 8/2004 |
| JP | 2007125821 | | 5/2007 |
| JP | 2007-188777 A | | 7/2007 |
| JP | 2008-186722 A | | 8/2008 |
| JP | 2008186722 | | 8/2008 |
| JP | 2009-21265 A | | 1/2009 |
| JP | 2009-076410 | * | 4/2009 |
| JP | 2009-76410 A | | 4/2009 |
| JP | 2009-224343 A | | 10/2009 |
| JP | 2011-110704 | | 6/2011 |
| WO | 2009-041395 A1 | | 4/2008 |
| WO | 2011-161837 | | 8/2011 |

OTHER PUBLICATIONS

English translation of JP Publication 2009-076410, Apr. 2009.*
Communication dated Jun. 2, 2015, issued by the State Intellectual Property Office of the People's Republic of China in counterpart Application No. 201280036128.2.
JP Office Action, Notice of Reasons for Rejection; Japanese Patent Application No. 2012-162909; Oct. 13, 2015 English Translation.
Presentation of Publications; dated Jul. 17, 2016; Japanese Patent Application No. 2012-162909 English Translation.

* cited by examiner

*Primary Examiner* — Brittany Raymond
(74) *Attorney, Agent, or Firm* — Sughrue Mion, PLLC

(57) ABSTRACT

The present invention provides a laminated porous film and a non-aqueous electrolyte secondary battery. The laminated porous film is a laminated porous film in which a heat-resistant layer comprising a binder resin and a filler is laminated on one or both of the surfaces of a porous film substrate mainly comprising a polyolefin, wherein a part occupied by at least one out of the binder resin and the filler is formed in the porous film substrate so as to touch the heat-resistant layer, and the total thickness of the occupied part is not less than 1% and not more than 20% of the overall thickness of the porous film substrate. The non-aqueous electrolyte secondary battery comprises the laminated porous film according as a separator.

11 Claims, No Drawings

LAMINATED POROUS FILM AND NON-AQUEOUS ELECTROLYTE SECONDARY BATTERY

CROSS REFERENCE TO RELATED APPLICATIONS

This application is a National Stage of International Application No. PCT/JP2012/068541 filed Jul. 17, 2012, claiming priority based on Japanese Patent Application No. 2011-165964 filed Jul. 28, 2011, the contents of all of which are incorporated herein by reference in their entirety.

TECHNICAL FIELD

The present invention relates to a laminated porous film and particularly to a laminated porous film suitable for a separator for a non-aqueous electrolyte secondary battery.

BACKGROUND ART

Non-aqueous electrolyte secondary batteries, especially lithium secondary batteries, have been used widely as the batteries to be used for personal computers, cellular phones, personal digital assistant devices, etc. due to their high energy densities.

Such non-aqueous electrolyte secondary batteries typified by lithium secondary batteries are high in energy density and they may generate heat due to the occurrence of high current when internal short-circuit or external short-circuit has been caused by damage to a battery or damage to an instrument in which a battery is used. Therefore, non-aqueous electrolyte secondary batteries have been demanded to prevent generation of a certain amount or more of heat and secure high safety.

A method of imparting a shutdown function to prevent further heat generation by blocking the passage of ions between the positive and negative electrodes with a separator at the time of abnormal heat generation is common as means for securing safety, and a method is available that involves using as the separator a porous film mainly made of a polyolefin that can melt on abnormal heat generation. In a battery including this separator, the porous film melts and closes pores on abnormal heat generation to block the passage of ions and thereby can suppress further generation of heat.

As a separator having a shutdown function, a porous film made of a polyolefin is used, for example. A separator made of the porous film melts and closes pores at about 80 to 180° C. on abnormal heat generation of a battery to block (shut-down) the passage of ions and thereby suppress further generation of heat. However, in some cases, a separator made of a polyolefin porous film allows a positive electrode and a negative electrode to come into direct contact with each other due to the shrinkage, rupture, or the like thereof, resulting in the occurrence of short circuit. A separator made of a polyolefin porous film has insufficient shape stability and may be unable to suppress abnormal heat generation caused by short circuit.

On the other hand, there has been studied a method of imparting shape stability at elevated temperatures to a separator by laminating a heat-resistant layer made of a heat-resistant material to the above-mentioned porous film (hereinafter may be referred to as the "porous film substrate"). As such a highly heat-resistant separator, for example, a separator prepared by immersing a regenerated cellulose film in an organic solvent to render it porous, followed by lamination to a porous film substrate, and a laminated porous film prepared by applying a coating slurry containing fine particles, a water-soluble polymer, and water to the surface of a porous film substrate, followed by drying have been proposed (see, for example, Patent Documents 1 and 2).

Although such a laminated porous film is produced by applying a coating slurry containing an inorganic filler and a binder resin to the surface of a porous film substrate uniformly, if the coating slurry penetrates into the porous film substrate during the application step, the binder resin, which is one of the components of the coating slurry, penetrates into the porous film substrate. Therefore, there is a problem that the inherent properties of the porous film substrate become no longer possible to be maintained, for example, the ion permeability or the shutdown property of the porous film substrate deteriorates.

Moreover, a porous film substrate for a laminated porous film is preferred to have a high porosity (for example, 50% or more) in order to gain improved ion permeability when used as a separator. In the porous film substrate, however, when the coating slurry has penetrated into the porous film substrate during the above-mentioned application step, the porous film substrate shrinks due to the shrinkage stress produced when the solvent component in the coating slurry that has penetrated is vaporized, so that the porous film substrate becomes incapable of maintaining a high porosity. Therefore, the porous film substrate has a problem that the characteristics of a resulting laminated porous film become inferior to those expected from the inherent characteristics of the porous film substrate.

PRIOR ART DOCUMENTS

Patent Documents
Patent Document 1: JP-A-10-3898
Patent Document 2: JP-A-2004-227972

SUMMARY OF THE INVENTION

It is an object of the present invention to provide a laminated porous film in which a heat-resistant layer containing a binder resin and a filler is laminated on a surface of a porous film mainly made of a polyolefin and serving as a substrate, the laminated porous film being capable of preserving the ion permeability or the shutdown property of the porous film.

The present invention provides the following.

<1> A laminated porous film in which a heat-resistant layer comprising a binder resin and a filler is laminated on one or both of the surfaces of a porous film substrate mainly comprising a polyolefin, wherein a part occupied by at least one out of the binder resin and the filler is formed in the porous film substrate so as to touch the heat-resistant layer, and the total thickness of the occupied part is not less than 1% and not more than 20% of the overall thickness of the porous film substrate.

<2> The laminated porous film according to <1>, wherein the thickness of the part occupied by the at least one out of the binder resin and the filler relative to the interface between the porous film substrate and the heat-resistant layer is not less than 1% and not more than 10% of the overall thickness of the porous film substrate.

<3> The laminated porous film according to <1> or <2>, wherein the thickness of a part substantially unoccupied by any binder resin or any filler in the porous film substrate is not less than 7 μm.

<4> The laminated porous film according to any one of <1> to <3>, wherein the binder resin is a water-soluble polymer.

<5> The laminated porous film according to <4>, wherein the binder resin is a cellulose ether.

<6> The laminated porous film according to any one of <1> to <5>, wherein the filler is an inorganic filler.

<7> The laminated porous film according to <6>, wherein the inorganic filler is alumina.

<8> The laminated porous film according to any one of <1> to <7>, wherein the laminated porous film is obtained by applying a coating slurry to the surface of the porous film substrate, the coating slurry comprising the binder resin, the filler and a solvent to form the heat-resistant layer and having a contact angle with a polyethylene sheet of 60° or more, and the porous film substrate having been surface treated so as to have a contact angle with the coating slurry of 65° or less, and removing the solvent.

<9> A non-aqueous electrolyte secondary battery including the laminated porous film according to anyone of <1> to <8> as a separator.

MODE FOR CARRYING OUT THE INVENTION

<Laminated Porous Film>

The present invention provides a laminated porous film in which a heat-resistant layer comprising a binder resin and a filler is laminated on one or both of the surfaces of a porous film substrate mainly comprising a polyolefin. A part occupied by at least one out of the binder resin and the filler is formed in the porous film substrate so as to touch the heat-resistant layer, and the total thickness of the occupied part is not less than 1% and not more than 20% of the overall thickness of the porous film substrate.

The porous film substrate (hereinafter sometimes referred to as the "A layer") has a structure including interconnected pores therewithin, and gas or liquid can permeate from one side to the other side of the porous film substrate.

The A layer has a property of closing pores by melting at high temperatures. Therefore, when the laminated porous film is in use as a separator, the A layer melts to close pores on abnormal heat generation of a battery and thereby imparts a shutdown function to the laminated porous film.

The heat-resistant layer (hereinafter sometimes referred to as the "B layer") has heat resistance at the temperature at which the porous film substrate closes pores and imparts a shape retention function to the laminated porous film. The B layer can be produced by applying the coating slurry comprising the binder resin and the filler to the A layer and then removing the solvent.

In the application step to form the B layer, if the coating slurry penetrates into the A layer excessively, the ion permeability of the A layer may be deteriorated or the shutdown function of the A layer may be inhibited by penetration of the filler or the binder resin that are components of the coating slurry into the A layer. Since the laminated porous film is characterized in that the total thickness of the part occupied by at least one out of the binder resin and the filler within the A layer is 20% or less, preferably 16% or less, of the overall thickness of the A layer, the deterioration in the ion permeability of the A layer caused by the filler or the binder resin can be substantially inhibited and the inhibition of the shutdown property is avoided.

Since the "part occupied by at least one out of the binder resin and the filler within the A layer" (hereinafter sometimes referred to as the "occupied part") is formed as a result of the solidification of the coating slurry that has penetrated within the A layer, the occupied part has been formed so as to touch the heat-resistant layer (the B layer) within the A layer. While the occupied part has an action to enhance the adhesion between the A layer and the B layer due to anchoring effects, the peeling of the B layer can be inhibited when the total thickness of the occupied part is 1% or more, preferably 2% or more, of the overall thickness of the A layer. If the total thickness of the occupied part is less than 1%, the B layer becomes prone to peel due to deteriorated adhesion between the A layer and the B layer.

While the occupied part is located on both sides of the A layer when the B layer has been formed on both sides of the A layer, the range of the thickness of the occupied part in this case shall be the total of the thickness of the part occupied by at least one out of the binder resin and the filler formed on both sides of the A layer.

The "part occupied by the binder resin and the filler (within the A layer)" means the part in which at least one out of the binder resin and the filler is observed within the A layer when a cross-section of the laminated porous film is observed with a SEM with a magnification of ×5000. The method for producing a cross-section for SEM observation is not restricted as long as a cross-section can thereby be obtained and the method is selected appropriately according to the ease of processing a laminated porous film. Specific methods include, for example, cutting with a razor or a microtome, splitting in liquid nitrogen, and cutting with an Ar ion beam or a Ga ion beam, each using a laminated porous film as received or a sample prepared by filling a filler such as a resin into pores of the A layer of a laminated porous film according to need.

In the SEM observation of a cross-section, in the event that the difference in contrast between a binder resin and the A layer mainly comprising a polyolefin is so small that it is difficult to observe the distribution of the binder resin, observation is conducted with some contrast difference produced by electronically staining the binder resin. Ruthenium tetroxide and osmium tetroxide are commonly used as the electron staining agent.

The overall thickness of the A layer in the laminated porous film shall be the value obtained by SEM observing the cross-section produced by the above-mentioned method.

It is preferred that the thickness of the part occupied by at least one of the binder resin and the filler relative to the interface between the A layer and the B layer is not less than 1% and not more than 10% of the overall thickness of the A layer. The "interface between the A layer and the B layer" is based specifically on the outline of the A layer observed when observing the interface between the A layer and the B layer in a cross-section of the laminated porous film with a SEM with a magnification of ×5000. The method for producing a cross-section for SEM observation and the method for observing the cross-section follow those described above.

The "thickness of a part occupied (by at least one of a binder resin and a filler) relative to the interface between the A layer and the B layer" as referred to herein means, when the B layer has been formed on both sides of the A layer, the thickness of the occupied part measured from each of both the interfaces of the A layer, and it is preferred that the thickness of the occupied part measured from each of both the interfaces is not less than 1% and not more than 10% of the overall thickness of the A layer.

In the event that the B layer has been formed on one side of the A layer in the laminated porous film, the "thickness of the part occupied by at least one of a binder resin and a filler relative to the interface between the A layer and the B layer"

agrees with the total thickness of the part occupied by at least one of the binder resin and the filler within the A layer.

When the thickness of the part occupied by at least one of the binder resin and the filler relative to the interface between the A layer and the B layer is within the above-mentioned range, a laminated porous film more improved in adhesion between the A layer and the B layer and shutdown performance will be obtained.

Preferably, the above-mentioned laminated porous film can be obtained by applying a coating slurry which comprises the binder resin and the filler for constituting the B layer and whose contact angle with a polyethylene sheet is 60° or more to the surface of the A layer surface-treated so as to have a contact angle with the coating slurry of 65° or less, and then removing the solvent. A detailed method will be described later.

Preferably, the thickness of a part substantially unoccupied by any binder resin or any filler in the porous film substrate (the A layer) is not less than 7 μm.

The "part substantially unoccupied by any binder resin or any filler" refers to a part in which neither a filler nor a binder resin is observed within the A layer when a cross-section of the laminated porous film is observed with a SEM with a magnification of ×5000. The method for producing a cross-section for the SEM observation and the method for observing the binder resin and the filler follow the methods described above.

The laminated porous film has a structure in which the B layer is laminated on one side or both sides of the A layer. The embodiment in which the B layer is laminated on one side of the A layer is preferred in that the lamination step can be simplified, and the embodiment in which the B layer is laminated on both sides of the A layer is preferred in handling efficiency because the resulting laminated porous film hardly curls.

The overall thickness of the laminated porous film (the A layer+the B layer) is usually 9 to 80 μm, preferably 10 to 50 μm, and particularly preferably 12 to 35 μm. If the thickness is excessively large, a non-aqueous electrolyte secondary battery in which the laminated porous film is used as the separator thereof tends to have a reduced electric capacitance.

The porosity of the entire part of the laminated porous film is usually 30 to 85% by volume, preferably 35 to 80% by volume.

The air permeability of the laminated porous film expressed in Gurley value is preferably 50 to 2000 sec/100 cc, more preferably 50 to 1000 sec/100 cc.

When a laminated porous film has an air permeability within such a range, it will exhibit sufficiently high ion permeability in the event that a non-aqueous electrolyte secondary battery is produced using the film as a separator, so that a loading characteristic that is high as a battery can be obtained.

The shape retention ratio upon heating of the laminated porous film at high temperatures at which shutdown occurs, expressed by the smaller value of the MD direction or the TD direction, is preferably 95% or more, more preferably 97% or more. The MD direction as referred to herein means the longitudinal direction at the time of sheet production, and the TD direction means the width direction at the time of sheet production. The elevated temperature at which shutdown occurs is a temperature of 80 to 180° C. and is usually about 130° C. to about 150° C.

In the laminated porous film may be included a porous film other than the porous film substrate and the heat-resistant layer, such as an adhesive film and a protective film, as long as the porous film does not disturb the object of the present invention significantly.

Hereafter, detailed description is made to the physical properties and the methods for producing the porous film substrate (the A layer), the heat-resistant layer (the B layer), and the laminated porous film.

<Porous Film Substrate (A Layer)>

The A layer is a porous film mainly comprising a polyolefin, having a structure including interconnected pores therewithin, and allowing gas or liquid to permeate from one side to the other side thereof, and the layer serves as the substrate of the laminated porous film.

The proportion of the polyolefin component in the A layer is required to be 50% by volume or more of the entire A layer, preferably 90% by volume or more, and more preferably 95% by volume or more.

It is preferred that a high-molecular-weight component having a weight average molecular weight of $5 \times 10^5$ to $15 \times 10^6$ is contained in the polyolefin component of the A layer. In particular, the inclusion of a polyolefin component having a weight average molecular weight of 1,000,000 or more as the polyolefin component of the A layer is preferred because this increases the strength of the A layer as well as the strength of the entire laminated porous film including the A layer.

Examples of the polyolefin include homopolymers and copolymers produced by polymerizing olefins such as ethylene, propylene, 1-butene, 4-methyl-1-pentene, and 1-hexene. Among them, a polyethylene prepared by homopolymerizing ethylene is preferred and a high-molecular-weight polyethylene having a weight average molecular weight of 1,000,000 or more is more preferred. A polypropylene prepared by homopolymerizing propylene is also preferred as the polyolefin.

The air permeability of the A layer expressed in Gurley value is usually within the range of 30 to 500 sec/100 cc, preferably within the range of 50 to 300 sec/100 cc.

When the A layer has an air permeability within the above-mentioned range, sufficient ion permeability can be obtained in use as a separator.

The porosity of the A layer is preferably 20 to 80% by volume, more preferably 30 to 75% by volume because such a porosity can increase the amount of an electrolytic solution retained and can afford a shutdown function certainly.

The pore diameter of the A layer is preferably 3 μm or less, more preferably 1 μm or less because such a diameter can afford sufficient ion permeability and can prevent particles from entering into a positive electrode or a negative electrode when the laminated porous film is used as the separator of a battery.

The thickness of the A layer has only to be a thickness with which an insulating property by shutdown can be obtained, and the thickness is usually 8 to 50 μm, and, in view of balance between the shutdown performance and the capacity of a secondary battery to be obtained, preferably 10 to 30 μm.

The thickness of the A layer as referred to herein means the thickness of the A layer as the base material of the laminated porous film and is measured on the basis of JIS standard (K7130-1992). Therefore, the measurement sometimes has some errors as compared with the thickness of the A layer determined by the above-mentioned SEM observation.

The weight per area of the A layer is usually 4 to 20 $g/m^2$ and preferably 5 to 12 $g/m^2$ in view of the strength, thickness, handleability, and weight of the laminated porous film as well as the capability of increasing the weight energy density or the volume energy density of a battery in use as a separator of the battery.

The A layer is not particularly restricted as long as it is mainly made of a polyolefin, and the A layer can have a single layer structure composed of only a single layer or a multilayer structure composed of two or more layers. Examples of the multilayer structure include a structure in which a polyolefin layer mainly made of a polyolefin is laminated on at least one side of a polyolefin layer mainly made of another polyolefin, and especially preferred is a structure in which a polypropylene layer mainly made of a polypropylene is laminated on both sides of a polyethylene layer mainly made of a polyethylene (polypropylene layer/ polyethylene layer/polypropylene layer).

The method for producing the A layer is not particularly restricted and examples thereof include a method in which a plasticizer is added to a thermoplastic resin, followed by forming into a film, and then the plasticizer is removed with an appropriate solvent as disclosed in JP-A-7-29563, and a method in which using a film made of a thermoplastic resin produced by a known method, structurally weak amorphous parts of the film are selectively stretched to form fine pores as disclosed in JP-A-7-304110.

For example, in the event that the A layer is formed from a polyolefin resin containing an ultrahigh-molecular-weight polyethylene and a low-molecular-weight polyolefin having a weight average molecular weight of 10,000 or less, it is preferred to produce the A layer by the method shown below from the viewpoint of production cost:

(1) a step of kneading 100 parts by weight of the ultrahigh-molecular-weight polyethylene, 5 to 200 parts by weight of the low-molecular-weight polyolefin having a weight average molecular weight of 10,000 or less, and 100 to 400 parts by weight of an inorganic filler, such as calcium carbonate, to obtain a polyolefin resin composition,
(2) a step of forming a sheet using the polyolefin resin composition,
(3) a step of removing the inorganic filler from the sheet obtained in step (2), and
(4) a step of stretching the sheet obtained in step (3) to obtain an A layer.

By altering conditions such as stretching speed, stretching temperature, and heat-setting temperature in step (4), it is possible to control the porosity of the A layer. The A layer may be a commercially available product and preferably has the above-mentioned characteristics.

<Heat-Resistant Layer (B Layer)>

The B layer is a heat-resistant layer comprising a binder resin and a filler. In the B layer, the proportion of the filler contained is preferably 50% by volume or more relative to the entire B layer (i.e., the total of the binder resin and the filler) and it is preferably 80% by volume or more, even more preferably 90% by volume or more because such a proportion reduces the risk of vacancies formed by filler particles in contact with one another to be clogged with other constituent ingredients, so that ion permeability can be maintained well and the weight per area is prevented from becoming excessively large.

An inorganic or organic filler can be used as the filler. Specific examples of the organic filler include fillers made of organic substances such as homopolymers or copolymers of two or more of styrene, vinyl ketone, acrylonitrile, methyl methacrylate, ethyl methacrylate, glycidyl methacrylate, glycidyl acrylate, methyl acrylate, etc.; fluororesins, such as polytetrafluoroethylene, tetrafluoroethylene-hexafluoropropylene copolymers, tetrafluoroethylene-ethylene copolymers, and polyvinylidene fluoride; melamine resins; urea resins; polyethylenes; polypropylenes; and polymethacrylates, and specific examples of the inorganic filler include fillers made of inorganic substances such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, and glass. These fillers may be used singly or in a mixture of two or more sorts thereof.

Of these, inorganic fillers are preferred as the filler, inorganic oxide fillers are more preferred, and an alumina filler is particularly preferred from the viewpoints of heat resistance and chemical stability.

While alumina includes many crystal forms, such as α-alumina, β-alumina, γ-alumina, and θ-alumina, any of them can be used suitably. Of these, α-alumina is most preferable because of its particularly high thermal or chemical stability.

The inorganic filler can be in various shapes depending upon the method for producing the inorganic substance to be used or dispersion conditions used in the preparation of the coating slurry, such as a spherical shape, an oval shape, a short shape, a gourd-like shape, and an infinite shape without any specific shape, and any shape can be used.

The average particle diameter of the filler is preferably 3 µm or less, and more preferably 1 µm or less. Examples of the shape of the filler include a spherical shape and a gourd-like shape. The average particle diameter of the filler can be determined by a method in which 25 particles are extracted arbitrarily, the particle size (diameter) of each particle is measured with a scanning electron microscope (SEM), and the average value of the 25 particle sizes is calculated as the average particle diameter, or a method in which the BET specific surface area is measured, and then the average particle diameter is calculated by spherically approximating the BET specific surface area. In the calculation of an average particle diameter with a SEM, when the shape of the filler is not a spherical shape, the length of the filler measured in the direction in which the largest length is detected is defined as the particle diameter. Two or more sorts of fillers differing in particle diameter or specific surface area may be included simultaneously in the B layer.

The thickness of the B layer is determined appropriately with consideration given to the number of the layers laminated in the laminated porous film. Especially, in the event that the A layer is used as a substrate and the B layer is formed on one side or both sides of the A layer, the thickness of the B layer (the total thereof is taken when provided on both sides) is usually not less than 0.1 µm and not more than 20 µm, and preferably not less than 2 µm and not more than 15 µm.

When the B layer is excessively thick, the load characteristics of a nonaqueous electrolyte secondary battery may deteriorate in use as a separator, whereas when the B layer is excessively thin, the separator may shrink due to failure to resist against the thermal shrinkage of the polyole fin porous film on abnormal heat generation of the battery.

The B layer comprises a binder resin in addition to the filler in order to bind filler particles constituting the layer and to bind the filler and the A layer together. As such a binder resin, preferred is a resin that is insoluble in the electrolytic solution of a battery and is electrochemically stable within the use range of the battery.

Examples thereof include polyolefins such as polyethylene and polypropylene, fluorine-containing resins such as polyvinylidene fluoride and polytetrafluoroethylene, fluorine-containing rubbers such as vinylidene fluoride-hexafluoropropylene-tetrafluoroethylene copolymers and ethylene-tetrafluoroethylene copolymers, styrene-butadiene copolymers and hydrogenated products thereof, rubbers such as methacrylate copolymers, acrylonitrile-acrylate copolymers, styrene-acrylate copolymers, ethylene-propylene rubbers, and polyvinyl acetate, resins having a melting point and a glass transition temperature of 180° C. or higher such as polyphenylene ether, polysulfone, polyethersulfone, polyphenylene sulfide, polyetherimide, polyamide-imide, polyetheramide, and polyester, and water-soluble polymers such as polyvinyl alcohol, polyethylene glycol, cellulose ether, sodium alginate, polyacrylic acid, polyacrylamide, and polymethacrylic acid.

In the coating slurry for forming the B layer, although a material in which such a binder resin is dispersed in the coating slurry can be used, a binder resin that dissolves in the coating slurry is preferred in that it can enhance the uniformity of the coating slurry and can bind the filler therewith in a smaller amount.

The selection of such a binder resin depends on the solvent in the coating slurry and, of the above-listed binder resins, especially water-soluble polymers such as cellulose ether, sodium alginate and polyacrylic acid are preferred in that they allow for the use of a solvent mainly composed of water as a solvent and from the viewpoints of a process and an environmental load. Of the water-soluble polymers, cellulose ether is used preferably.

Specific examples of the cellulose ether include carboxymethylcellulose (CMC), hydroxyethylcellulose (HEC), carboxyethylcellulose, methylcellulose, ethylcellulose, cyanoethyl cellulose, and oxyethyl cellulose; CMC and HEC, which are superior in chemical stability, are particularly preferred, and especially, CMC is preferred. Carboxymethylcellulose (CMC) includes carboxymethylcellulose sodium.

<Method for Producing Laminated Porous Film>

The method for producing a laminated porous film is not particularly restricted as long as the above-mentioned laminated porous film can be obtained thereby, and examples thereof include a method in which a coating slurry containing a filler, a binder resin, and a solvent is applied directly onto the A layer and the solvent is removed; and a method in which dip coating is carried out by dipping the A layer into the coating slurry, and then the solvent is removed.

In the case of laminating the B layer on both sides of the A layer, a sequential lamination method in which a B layer is formed on one side and then another B layer is laminated on the other side, or a simultaneous lamination method in which B layers are formed simultaneously on both sides of the A layer can be used.

In the coating slurry, the solvent can dissolve or disperse the filler and the binder resin and also has characteristics as a dispersing medium. The solvent has only to dissolve or disperse the filler and the binder resin uniformly and stably. Specific examples of the solvent include water, alcohols such as methanol, ethanol, and isopropanol, acetone, toluene, xylene, hexane, N-methylpyrrolidone, N,N-dimethylacetamide, and N,N-dimethylformamide, and these can be used singly or a plurality of them may be mixed for use as long as they are miscible with one another.

Although the solvent may be composed of only water, a mixed solvent of water and an organic polar solvent is preferred in that it has high removal rate by drying and sufficient solvency for the above-mentioned water-soluble polymer.

When the solvent is composed of only an organic solvent, the solvent may be deficient in leveling due to an excessively increased drying rate, and it also may be deficient in solvency in the case of using the above-mentioned water-soluble polymer as the binder resin.

As the organic polar solvent to be used for the mixed solvent, alcohols that are miscible with water in any proportions and have moderate polarities are preferred, and of them, methanol, ethanol, and isopropanol are used. While the proportions of the water and the polar solvent are selected in consideration of the leveling property and the type of the binder resin to be used within such a range that the above-mentioned contact angle range is achieved, the mixed solvent usually contains water in a content of 50% by weight of more.

The coating slurry may, as required, comprise ingredients other than the filler and the binder resin as long as the object of the present invention is not impaired. Examples of such ingredients include a dispersing agent, a plasticizer, and a pH adjuster.

The method for obtaining the coating slurry by dispersing the filler and the binder has only to be a method necessary for obtaining a uniform coating slurry. Examples thereof include a mechanical agitation method, an ultrasonic dispersion method, a high pressure dispersion method, and a media dispersion method.

The order of mixing is arbitrary as long as no particular problem, such as generation of precipitations, is caused; for example, the filler, the binder resin, and other ingredients may be added to the solvent at once and then mixed, or alternatively the respective ingredients may be separately dispersed in the solvent and then mixed.

Preferably, the coating slurry is prepared so that it has a contact angle with a polyethylene sheet of 60° or more. The standard polyethylene sheet to be used is a hard polyethylene sheet of 1-mm thick grade (produced by Kyoei Jushi Corporation).

The A layer is a porous film mainly comprising a polyolefin as described above, and by adjusting its contact angle with a polyethylene sheet, which is one of polyolefins, to not less than the above-mentioned value, it is possible to inhibit penetration of the coating slurry into the A layer.

Thus, performance degradation of the A layer resulting from the excessive penetration of the coating slurry into the A layer can be inhibited, so that a laminated porous film can be obtained by laminating a B layer comprising a binder resin and a filler on a porous film substrate without impairing the high ion permeability of the porous film substrate.

On the other hand, when the contact angle of the coating slurry with the polyethylene sheet is less than 60°, the coating slurry may penetrate into the A layer excessively and the inherent physical properties of the A layer may fail to be maintained.

Although depending upon the viscosity of the coating slurry or the surface condition of the porous film substrate to be coated, a contact angle of the coating slurry with the polyethylene sheet of 80° or less is preferred because it allows for highly uniform coating.

The preparation of the coating slurry is carried out by adjusting the types and the mixing proportions of the binder resin, the filler, and the solvent to be contained in the coating slurry. It is preferred to adjust the contact angle of the coating slurry with the polyethylene sheet by the selection of the solvent and the adjustment of the concentration because the coating slurry can thereby be prepared easily without impairing the properties of the A layer.

In the case of using the coating slurry whose contact angle with a polyethylene sheet has been adjusted to the above-mentioned value or more, the coating slurry may be applied directly to the A layer. However, in order to apply the coating slurry onto the A layer uniformly and thinly without causing defective application, such as shedding of the slurry, it is preferred to subject the surface of the A layer to surface treatment before applying the coating slurry to the surface of the A layer so that the contact angle with the coating slurry may become not more than 65° (more preferably not more than 60°).

By carrying out the surface treatment of the A layer so that the contact angle with the coating slurry may become not more than the above-mentioned value, the affinity of the coating slurry with the A layer increases, so that the coating slurry can be applied to the A layer more uniformly.

The "surface treatment of the A layer" as referred to herein means to modify the surface of the A layer physically or chemically so as to satisfy the above-mentioned condition with respect to contact angle, and specifically means to treat the surface of the A layer so that its surface roughness is increased or the surface may come to have affinity with the ingredients (especially, the solvent) of the coating slurry.

By subjecting the A layer to surface treatment, coatability is improved, so that a more uniform heat-resistant layer (the B layer) can be obtained. The surface treatment may be carried out at any time before carrying out coating, and to carryout the surface treatment just before coating is preferred in that the influence of change with time can be reduced.

The method of the surface treatment may be any method as long as the above-mentioned conditions with respect to contact angle are satisfied, and specific examples thereof include a chemical agent treatment with an acid or an alkali, a corona discharge treatment method, a plasma treatment method, a mechanical surface roughening method, a solvent treatment method, an acid treatment method, and an ultraviolet ray oxidation method.

In the corona discharge treatment method, the A layer can be modified in a relatively short time and the inherent characteristics of the A layer are preserved approximately completely because the modification by corona discharge is limited only to the vicinity of the surface of the A layer and the penetration of the coating slurry is limited only to the vicinity of the surface. Therefore, excessive penetration of the coating slurry into the pores (voids) of the B film can be inhibited during the application step and deterioration in the shutdown property of the A layer caused by solvent residue or by binder resin deposition can be avoided.

The method of applying the coating slurry to the A layer is not particularly restricted as long as it is a method that can realize a required weight per area or a required coating area and conventionally known methods can be employed. Examples thereof include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a die coat er method, a screen printing method, and a spray coating method.

Although the surface to be coated is restricted in some cases depending upon the application of the laminated porous film, either of one side and both sides of the A layer may be coated as long as the performance of the laminated porous film is not impaired; in double side coating, either sequential double side coating or simultaneous double side coating may be adopted.

A heat-resistant layer (a B layer) is formed on the A layer by removing the solvent from the coating slurry applied onto the A layer.

The method for removing the solvent is commonly a method that involves drying. The method of drying may be any method, such as natural drying, blow drying, heat drying, and reduced pressure drying. It is also permitted to carry out drying after replacing the solvent of the coating slurry with another solvent.

In the case where heating is carried out in removing the solvent of the coating slurry or other replacement solvents from the A layer onto which the coating slurry has been applied, it is preferred to carry out the heating at a temperature at which the air permeability of the A layer is prevented from lowering in order to avoid the lowering of the air permeability due to shrinkage of pores of the A layer.

<Non-Aqueous Electrolyte Secondary Battery>

The laminated porous film can be suitably used as a separator of batteries, especially, non-aqueous electrolyte secondary batteries such as lithium secondary batteries.

Although components other than a separator for a non-aqueous electrolyte secondary battery, such as a lithium secondary battery, are explained below, the method of using the separator is not limited thereto.

As the non-aqueous electrolytic solution, a non-aqueous electrolytic solution prepared by dissolving a lithium salt in an organic solvent can be used, for example. The lithium salt may be one member or a mixture of two or more members selected from $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, a lithium salt of a lower aliphatic carboxylic acid, and $LiAlCl_4$. Of these, preferred is a material containing at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$ as the lithium salt.

Examples of the non-aqueous electrolytic solution include carbonates such as propylene carbonate, ethylene carbonate, dimethyl carbonate, diethyl carbonate, ethylmethyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and Y-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone, or substances resulting from the introduction of a fluorine group into the above-mentioned substances; two or more of these may be used in combination.

Above all, non-aqueous electrolytic solutions containing carbonates are preferred, and a mixture of a cyclic carbonate with an acyclic carbonate or a mixture of a cyclic carbonate with an ether is more preferred. As the mixture of a cyclic carbonate and an acyclic carbonate, a mixture containing ethylene carbonate, dimethyl carbonate, and ethylmethyl carbonate is preferred in the point that it has a wide operating temperature range and it is refractory even in the event that a graphite material such as natural graphite and artificial graphite is used as an active material of the negative electrode.

A positive electrode sheet is usually a sheet that supports a mixture containing a positive electrode active material, a conductive material, and a binder on a current collector, and specifically, it can include a material capable of doping and dedoping with lithium ions as the positive electrode active material, a carbonaceous material as the conductive material, and a thermoplastic resin, etc. as the binder. Examples of the material capable of doping and dedoping with lithium ions include lithium composite oxides containing at least one transition metal such as V, Mn, Fe, Co, and Ni. In view of a high average discharge potential, examples of a particularly preferred one include lithium composite oxides having an α-NaFeO$_2$ type structure, such as lithium nickelate and lithium cobaltate, and lithium composite oxides having a spinel type structure, such as lithium manganese spinel.

The lithium composite oxide may contain various metal elements, and especially, the use of a composite lithium nickelate containing at least one metal element selected from the group consisting of Ti, V, Cr, Mn, Fe, Co, Cu, Ag, Mg, Al, Ga, In, and Sn in a content of 0.1 to 20 mol % relative to the sum total of the number of moles of the at least one metal element and the number of moles of Ni in lithium nickelate is preferred because the use improves the cycle characteristics in use at a high capacity.

Examples of the binder include thermoplastic resins, such as polyvinylidene fluoride, copolymers of vinylidene fluoride, polytetrafluoroethylenes, tetrafluoroethylene-hexafluoropropylene copolymers, tetrafluoroethylene-perfluoroalkyl vinyl ether copolymers, ethylene-tetrafluoroethylene copolymers, vinylidene fluoride-hexafluoropropylene-tetrafluoroethylene copolymers, thermoplastic polyimides, polyethylenes, and polypropylenes.

Examples of the conducting agent include carbonaceous materials, such as natural graphite, artificial graphite, cokes, and carbon black. Such conductive materials each may be used singly or alternatively, for example, artificial graphite and carbon black may be mixed for use.

A sheet in which a material capable of being doped and dedoped with lithium ions is supported on a negative electrode current collector, lithium metal or a lithium alloy, etc. can be used as the negative electrode sheet. Examples of the material capable of being doped and dedoped with lithium ions include carbonaceous materials, such as natural graphite, artificial graphite, cokes, carbon black, pyrolytic carbon, carbon fibers, and organic polymer fired bodies, and chalcogen compounds such as oxides and sulfides capable of being doped and dedoped with lithium ions at lower potentials than the positive electrode. As the carbonaceous material, a carbonaceous material mainly made of a graphite material such as natural graphite and artificial graphite is preferred in that a large energy density is successfully obtained because of its high potential smoothness and low average discharge potential when combined with a positive electrode.

While Cu, Ni, stainless steel, etc. can be used as the negative electrode current collector, Cu is preferred in that it hardly forms an alloy together with lithium especially in a lithium secondary battery and can be processed easily into a thin film. Examples of the method for supporting a mixture containing a negative electrode active material on the negative electrode current collector include a method involving compression molding, or a method in which a paste is formed from the material using a solvent, applied onto the current collector, dried, and then pressed to pressure-bond the paste onto the current collector.

The shape of the battery is not particularly restricted and may be any shape such as a paper shape, a coin shape, a cylinder shape, a rectangular shape, and a laminated shape.

When a non-aqueous electrolyte secondary battery is produced using the laminated porous film as a separator, there can be obtained a non-aqueous electrolyte secondary battery with enhanced safety that has high load characteristics and that allows the separator to exert a shutdown function and successfully avoids the contact of the positive electrode with the negative electrode due to shrinkage of the separator when the battery has generated heat.

EXAMPLES

The present invention is described in more detail byway of examples, but the invention is not limited to the examples unless its gist is modified.

In examples and comparative examples, physical properties of the separators were measured by the following methods (1) through (9).

(1) Thickness Measurement (Unit: μm)

The thickness of a laminated porous film and the thickness of an A layer before the preparation of a laminated porous film were measured in accordance with JIS standard (K7130-1992).

(2) Weight Per Area (Unit: g/m$^2$)

A film was cut into a square measuring 10 cm long on each side and then the weight W (g) thereof was measured. The weight per area was calculated by the following formula. The weight per area of the B layer was calculated by subtracting the weight per area of the porous film substrate (A layer) from the weight per area of the laminated porous film.

$$\text{Weight per area (g/m}^2\text{)}=W/(0.1\times0.1)$$

(3) Porosity (Unit: % by Volume)

A film was cut into a square measuring 10 cm long on each side, and then the weight W (g) and the thickness D (cm) thereof were measured. The weights of the materials contained in the sample were calculated, the weight of each material Wi (g) was divided by the true specific gravity to calculate the volume of each material, and then the porosity (% by volume) was calculated from the following formula.

$$\text{Porosity (\% by volume)}=100-[\{(W1/\text{true specific gravity 1})+(W2/\text{true specific gravity 2})+\ldots+(Wn/\text{true specific gravity } n)\}/(10\times10\times D)]\times100$$

(4) Air Permeability (Unit: Sec/100 cc)

The air permeability of a film was measured using a Gurley densometer equipped with a digital timer manufactured by Toyo Seiki Seisaku-sho Ltd. on the basis of JIS P 8117.

(5) Measurement of Shutdown (SD) Performance

A cell for the measurement of shutdown was prepared by impregnating a 17.5 mmφ laminated porous film with an electrolytic solution, sandwiching the film between two SUS electrodes, and then fixing the film with a clip. A solution prepared by dissolving 1 mol/L of LiBF$_4$ in a mixed solvent of 50% by volume of ethylene carbonate and 50% by volume of diethyl carbonate was used as the electrolytic solution. Terminals of an impedance analyzer were connected to the electrodes of the assembled cell, and the resistivity at 1 kHz was measured while raising the temperature at a rate of 15° C./minute in an oven. Thus, the resistivity measured at 145° C. was considered as the shutdown performance of the laminated porous film.

(6) Measurement of Thickness Change of Porous Film Substrate (A Layer) Caused by Application A laminated porous film was immersed in water and thereby the heat-resistant layer (B layer) was washed away with water completely. Subsequently, without drying, the thickness of the porous film substrate (A layer) was measured by the same method as in the thickness measurement (1), and then the change in thickness of the A layer before and after coating was evaluated using the following formula.

Thickness change (μm) of A layer=(thickness of A layer after removal of B layer)−(thickness of A layer before application of B layer)

(7) Thickness of Heat-Resistant Layer (B Layer)

The thickness of a B layer was calculated by the following formula.

Thickness (μm) of B layer=(overall thickness of laminated porous film)−(thickness of A layer after removal of B layer)

(8) Contact Angle Measurement

One drop (2 μl) of a coating slurry was dropped into a sample, and a contact angle was measured in 10 to 30 seconds after the dropping. This contact angle measurement was repeated 5 times in total and the average thereof was used as the contact angle of the sample. A contact angle meter (Model CA-X, manufactured by Kyowa Interface Science Co., Ltd.) was used for the measurement of a contact angle.

The standard polyethylene sheet used was a hard polyethylene sheet of 1-mm thick grade (produced by Kyoei Jushi Corporation) available from KOKUGO Co., Ltd.

(9) Evaluation of Thickness of Each Part in Laminated Porous Film

Overall thickness of A layer: L

Thickness of part occupied by at least one out of binder resin and filler relative to the interface between A layer and B layer: l1 (on one side), l2 (on the other side)

Total thickness of part occupied by at least one out of binder resin and filler: L1

Thickness of part substantially unoccupied by any binder resin or any filler: L2

A laminated porous film was electronically stained with ruthenium tetroxide and then an epoxy resin was filled into the pores of the laminated porous film. After the epoxy resin cured, cross-section processing was conducted with FIB and the cross-section formed was observed with a SEM at an acceleration voltage of 2 kV and a magnification of ×5000. Thus, L, l1, and l2 were evaluated.

In the case of lamination on both sides, the sum total of l1 and l2 was taken as L1. The difference between L and L1 was taken as the thickness L2 of the part substantially unoccupied by any binder resin or any filler.

Example 1

(1) Preparation of Coating Slurry

The coating slurry of Example 1 was prepared in the following procedures. First, carboxymethylcellulose sodium (CMC, Cellogen 3H produced by Dai-Ichi Kogyo Seiyaku Co., Ltd.) was dissolved in a 20% by weight aqueous ethanol solution as a solvent, yielding a CMC solution (CMC concentration: 0.70% by weight vs. CMC solution). Subsequently, 3500 parts by weight alumina (AKP3000, produced by Sumitomo Chemical Co., Ltd.) was added and mixed with 100 parts by weight, in a CMC equivalent, of the CMC solution, followed by treatment with a Gaulin Homogenizer under high pressure dispersion conditions (60 MPa) repeated three times. Thus, a coating slurry 1 was prepared. The contact angle of the coating slurry 1 with a polyethylene sheet was 64°. The composition of the coating slurry 1 is shown in Table 1.

(2) Preparation of Porous Film Substrate

A polyolefin resin composition was prepared by adding 70% by weight of an ultrahigh-molecular-weight polyethylene powder (340M, produced by Mitsui Chemicals, Inc.) and 30% by weight of a polyethylene wax with a weight average molecular weight of 1000 (FNP-0115, produced by Nippon Seiro Co., Ltd.) as well as, per 100 parts by weight of the ultrahigh-molecular-weight polyethylene and the polyethylene wax in total, 0.4% by weight of an antioxidant (Irg 1010, produced by Ciba Specialty Chemicals), 0.1% by weight of an antioxidant (P168, produced by Ciba Specialty Chemicals), and 1.3% by weight of sodium stearate, further adding calcium carbonate with an average pore diameter of 0.1 μm (produced by Maruo Calcium Co., Ltd.) so as to occupy 38% by volume based on the overall volume, mixing these ingredients in the form of powder with a Henschel mixer, followed by melt-kneading with a twin screw kneading machine. The polyolefin resin composition was rolled into a sheet with a pair of rolls having a surface temperature of 150° C. Calcium carbonate was removed by immersing the sheet into an aqueous hydrochloric acid solution (hydrochloric acid: 4 mol/L, nonionic surfactant: 0.5% by weight) and then the sheet was stretched in TD, affording a porous film substrate A1. Properties of A1 are shown in Table 2.

(3) Contact Angle Evaluation

The contact angle of the porous film substrate A1 (untreated) obtained in (2) with the coating slurry 1 was 80°. Subsequently, surface treatment was conducted by subjecting the surface of the porous film substrate A1 to corona discharge treatment at an output of 100 W/(m$^2$/minute). The contact angle of the porous film substrate A1 after the surface treatment with the coating slurry 1 was 40°.

(4) Preparation of Laminated Porous Film

A laminated porous film was prepared by applying the above-mentioned coating slurry 1 sequentially to both surfaces of the surface-treated porous film substrate A1 as a substrate with a gravure coating machine, and then drying the slurry. Physical properties of the porous film substrate A1, the heat-resistant layer, and the laminated porous film are shown in Tables 2 and 3. L, l1, l2, L1, L2, and the ratios among them determined from a cross-section SEM image of the laminated porous film are shown in Table 4. As shown in Table 4, thicknesses l1 and l2 were the same.

(5) Heat Resistance Evaluation

A resulting laminated porous film was cut into 8 cm×8 cm. The laminated porous film on which a square of 6 cm×6 cm had been drawn was placed in an oven of 150° C. and heated for one hour while being sandwiched between paper sheets. The shape retention ratio upon heating in the MD direction (i.e., the longitudinal direction at the time of sheet production) and the TD direction (i.e., the width direction at the time of sheet production) was calculated by measuring the distance between the lines of the film after heating. Thus, the shape retention ratio was found to be 99% in both MD and TD, so that the laminated porous film was found to be high in heat resistance.

Example 2

(1) Preparation of Laminated Porous Film

A commercially available porous film of polyethylene was used as a porous film substrate A2. Properties of A2 are shown in Table 2. The above-mentioned coating slurry 1 was used as a coating slurry. The contact angle of A2 (untreated) with the coating slurry 1 was 85°.

Subsequently, surface treatment was conducted by subjecting the surface of the porous film substrate A2 to corona discharge treatment at an output of 100 W/(m$^2$/minute). The contact angle of the porous film substrate A2 after the surface treatment with the coating slurry 1 was 43°.

In addition, a laminated porous film was prepared by applying the above-mentioned coating slurry 1 sequentially to both surfaces of the surface-treated porous film substrate A2 as a substrate with a gravure coating machine, and then drying the slurry. Physical properties of the porous film substrate A2, the heat-resistant layer, and the laminated porous film are shown in Tables 2 and 3. L, l1, l2, L1, L2, and the ratios among them determined from a cross-section SEM image of the laminated porous film are shown in Table 4. As shown in Table 4, thicknesses l1 and l2 were the same.

(2) Heat Resistance Evaluation

The shape retention ratio upon heating of the resulting laminated porous film was calculated by the same operations as in Example 1. Thus, the shape retention ratio was found to be 99% in both MD and TD, so that the laminated porous film was found to be high in heat resistance.

Example 3

(1) Preparation of Laminated Porous Film

A coating slurry 2 was prepared by carrying out the same operations as for the coating slurry 1 except that isopropanol (IPA) was used instead of ethanol. The contact angle of the coating slurry 2 with a polyethylene sheet was 51°. The composition of the coating slurry 2 is shown in Table 1.

A commercially available porous film made of a polyolefin having a three-layer structure (polypropylene layer/polyethylene layer/polypropylene layer) was used as a porous film substrate A3. Properties of A3 are shown in Table 2. The above-mentioned coating slurry 2 was used as a coating slurry. The contact angle of A3 (untreated) with the coating slurry 2 was 63°.

Subsequently, surface treatment was conducted by subjecting the surface of the porous film substrate A3 to corona discharge treatment at an output of 36 W/(m$^2$/minute). The contact angle of the porous film substrate A3 after the surface treatment with the coating slurry 2 was 34°.

In addition, a laminated porous film was prepared by applying the above-mentioned coating slurry 2 sequentially to both surfaces of the surface-treated porous film substrate A3 as a substrate with a gravure coating machine, and then drying the slurry. Physical properties of the porous film substrate A3, the heat-resistant layer, and the laminated porous film are shown in Tables 2 and 3. L, l1, l2, L1, L2, and the ratios among them determined from a cross-section SEM image of the laminated porous film are provided in Table 4. As shown in Table 4, thicknesses l1 and l2 were the same.

(2) Heat Resistance Evaluation

The shape retention ratio upon heating of the resulting laminated porous film was calculated by the same operations as in Example 1. Thus, the shape retention ratio was found to be 99% in both MD and TD, so that the laminated porous film was found to be high in heat resistance.

Comparative Example 1

(1) Preparation of Coating Slurry

A coating slurry 3 was prepared by carrying out the same operations as those for the coating slurry 1 except that the concentration of the aqueous ethanol solution was adjusted to 30% by weight in the operations of (1) preparation of coating slurry of the above-mentioned Example 1. The contact angle of the coating slurry 3 with a polyethylene sheet was 55°. The composition of the coating slurry 3 is shown in Table 1.

(2) Preparation of Laminated Porous Film

A laminated porous film was prepared by applying the above-mentioned coating slurry 3 sequentially to both surfaces of the porous film substrate A1 as a substrate with a gravure coating machine, and then drying the slurry. Physical properties of the porous film substrate A1, the heat-resistant layer, and the laminated porous film are shown in Tables 2 and 3.

L, l1, l2, L1, L2, and the ratios among them determined from a cross-section SEM image of the laminated porous film are provided in Table 4. Since the presence of the binder resin was observed throughout the A layer, the values of l1 and l2 are not provided.

Comparative Example 2

The preparation of a laminated porous film was attempted by carrying out the operations as those in (4) preparation of laminated porous film of the above-mentioned Example 1 except that the corona discharge treatment was not carried out and the above-mentioned coating slurry 1 was applied onto both sides of the porous film substrate A1 sequentially and then dried. However, the coating slurry was repelled on the surfaces of the porous film substrate in applying the coating slurry 1 to the surfaces of A1, so that a uniform laminated porous film was not obtained.

TABLE 1

| | Dispersion conditions | | | Binder resin (part by weight) | Filler (part by weight) | Liquid composition (% by weight) | | | Contact angle (°) |
|---|---|---|---|---|---|---|---|---|---|
| Sample | Dispersing machine | Number of passes (pass) | Dispersing pressure (MPa) | CMC | Alumina AKP3000 | Binder resin | Water | Alcohol | with PE sheet |
| Coating slurry 1 | gaulin | 3 | 60 | 100 | 3500 | 0.7 | 80 | 20 | 64 |

TABLE 1-continued

| | Dispersion conditions | | | | | Liquid composition (% by weight) | | | Contact angle (°) with PE sheet |
|---|---|---|---|---|---|---|---|---|---|
| Sample | Dispersing machine | Number of passes (pass) | Dispersing pressure (MPa) | Binder resin (part by weight) CMC | Filler (part by weight) Alumina AKP3000 | Binder resin | Water | Alcohol | |
| Coating slurry 2 | gaulin | 3 | 60 | 100 | 3500 | 0.7 | 80 | 20 | 51 |
| Coating slurry 3 | gaulin | 3 | 60 | 100 | 3500 | 0.7 | 70 | 30 | 55 |

Alcohol: ethanol in coating slurries 1 and 3, isopropanol in coating slurry 2.
PE: polyethylene

TABLE 2

| | | | | | Porous film substrate (A layer) | | | | | | | |
|---|---|---|---|---|---|---|---|---|---|---|---|---|
| | | | | | Contact angle (°) | | | | | Air permeability Gurley sec/100 cc | SD performance Ω | Change in thickness before and after application μm |
| Sample | No. | Material | Surface treatment | Coated surface | Untreated | After surface treatment | Thickness μm | Weight per area g/m² | Porosity % by volume | | | |
| Example 1 | A1 | PE | Present | Both sides | 80 | 40 | 18.1 | 7.0 | 59 | 88 | 8100 | 0.0 |
| Example 2 | A2 | PE | Present | Both sides | 85 | 43 | 17.3 | 10.0 | 38 | 524 | 85000 | 0.0 |
| Example 3 | A3 | * | Present | Both sides | 63 | 34 | 20.2 | 11.5 | 37 | 507 | 99000 | 0.0 |
| Comparative Example 1 | A1 | PE | Absent | Both sides | 65 | — | 18.1 | 7.0 | 59 | 88 | 8100 | −1.2 |
| Comparative Example 2 | A1 | PE | Absent | — | 65 | — | 18.1 | 7.0 | 59 | 88 | 8100 | — |

PE: polyethylene
* three layers of polypropylene/polyethylene/polypropylene

TABLE 3

| | | Heat-resistant layer (B layer) | | Properties of laminated porous film | | | |
|---|---|---|---|---|---|---|---|
| Sample | Coating slurry | Thickness μm | Basis weight Weight per area g/m² | Overall film thickness μm | Overall weight per area g/m² | Air permeability Gurley sec/100 cc | SD performance Ω |
| Example 1 | Coating slurry 1 | 8.2 | 11.7 | 26.3 | 18.7 | 120 | 7800 |
| Example 2 | Coating slurry 1 | 6.6 | 8.9 | 23.9 | 18.9 | 699 | 10200 |
| Example 3 | Coating slurry 2 | 6.4 | 7.8 | 26.6 | 19.3 | 526 | 40200 |
| Comparative Example 1 | Coating slurry 3 | 7.7 | 12.1 | 24.6 | 19.1 | 145 | 130 |
| Comparative Example 2 | Coating slurry 1 | — | — | — | — | — | — |

TABLE 4

| | Thickness (μm) | | | | | Proportion (%) | | |
|---|---|---|---|---|---|---|---|---|
| | L | l1 | l2 | L1 | L2 | l1/L | l2/L | L1/L |
| Example 1 | 17.9 | 1.4 | 1.4 | 2.8 | 15.1 | 7.8 | 7.8 | 15.6 |
| Example 2 | 17.4 | 0.5 | 0.5 | 1 | 16.4 | 2.9 | 2.9 | 5.7 |
| Example 3 | 20.0 | 0.4 | 0.4 | 0.8 | 19.2 | 2.0 | 2.0 | 4.0 |
| Comparative Example 1 | 16.7 | — | — | 16.7 | 0.0 | — | — | 100.0 |

INDUSTRIAL APPLICABILITY

According to the present invention, a laminated porous film is provided which is superior in ion permeability (air permeability) and shutdown property and also in shape retention under heating and which is suitable as a separator of a non-aqueous electrolyte secondary battery.

According to the present invention, a laminated porous film superior in thermal stability and ion permeability (air permeability) is provided. The present invention is very useful industrially because a non-aqueous electrolyte secondary battery including a laminated porous film as a separator allows the separator to prevent the positive electrode and the negative electrode from coming into contact directly with each other even if the battery generates heat and the non-aqueous electrolyte secondary battery is rendered safer by the preservation of insulating properties due to rapid closure of pores of the porous film substrate mainly made of a polyolefin.

The invention claimed is:

1. A laminated porous film in which a heat-resistant layer comprising a binder resin and a filler is laminated on one or both of the surfaces of a porous film substrate mainly comprising a polyolefin, wherein a part occupied by at least one out of the binder resin and the filler is formed in the porous film substrate so as to touch the heat-resistant layer, and the total thickness of the occupied part is not less than 4% and not more than 20% of the overall thickness of the porous film substrate.

2. The laminated porous film according to claim 1, wherein the thickness of the part occupied by the at least one out of the binder resin and the filler relative to the interface between the porous film substrate and the heat-resistant layer is not less than 2% and not more than 10% of the overall thickness of the porous film substrate.

3. The laminated porous film according to claim 1, wherein the thickness of a part substantially unoccupied by any binder resin or any filler in the porous film substrate is not less than 7 μm.

4. The laminated porous film according to claim 1, wherein the binder resin is a water-soluble polymer.

5. The laminated porous film according to claim 4, wherein the binder resin is a cellulose ether.

6. The laminated porous film according to claim 1, wherein the filler is an inorganic filler.

7. The laminated porous film according to claim 6, wherein the inorganic filler is alumina.

8. The laminated porous film according to claim 1, wherein the laminated porous film is obtained by applying a coating slurry to the surface of the porous film substrate, the coating slurry comprising the binder resin, the filler and a solvent to form the heat-resistant layer and having a contact angle with a polyethylene sheet of 60° or more, and the porous film substrate having been surface treated so as to have a contact angle with the coating slurry of 34° or more and less than or equal to 65°, and removing the solvent.

9. The laminated porous film according to claim 1, wherein the total thickness of the part occupied by the at least one out of the binder resin and the filler is not less than 4% and not more than 16% of the overall thickness of the porous film substrate.

10. A non-aqueous electrolyte secondary battery comprising the laminated porous film according to claim 1 as a separator.

11. A laminated porous film in which a heat-resistant layer comprising a binder resin and a filler is laminated on one or both of the surfaces of a porous film substrate mainly comprising a polyolefin, wherein a part occupied by at least one out of the binder resin and the filler is formed in the porous film substrate so as to touch the heat-resistant layer, and the thickness of the occupied part relative to the interface between the porous film substrate and the heat-resistant layer is not less than 2% and not more than 10% of the overall thickness of the porous film substrate.

* * * * *